Patented May 3, 1938

2,116,184

UNITED STATES PATENT OFFICE 2,116,184

METHOD OF MOISTUREPROOFING

Edward B. Beale, Winnetka, Ill., assignor to Standard Oil Company, Chicago, Ill., a corporation of Indiana No Drawing. Application May 4, 1936, Serial No. 77,792

7 Claims. (Cl. 91—68)

This invention relates to moisture-proofing compositions, and in particular, to moisture-proofing compositions for non-fibrous materials.

The use of non-fibrous, smooth surface, transparent sheets, such as sheets of regenerated cellulose, cellulose derivatives, such as cellulose nitrate, acetate, ether and the like, and albuminous materials such as gelatin, agar-agar and the like for wrapping and packaging purposes, has to a large extent replaced paper and the like for such purposes. The widespread use of such materials has been in a large measure due to their transparent and moisture-proof properties. Heretofore, materials of the aforementioned type have been made moisture-proof by treatment with various materials, such as the application of compositions comprising waxes, plasticizers, drying oils, rosin, gums and mixtures thereof. There are several undesirable properties inherent in the prior moisture-proofing compositions applied to sheets of regenerated cellulose and the like. Among these may be mentioned the tendency of the moisture-proofing composition material to become brittle and crack at low temperatures. Secondly, the ease with which the moisture-proofing material is removed by handling, particularly if the coating be soft.

It is, therefore, an object of this invention to provide a moisture-proofing composition for non-fibrous, transparent sheets of regenerated cellulose, cellulose derivatives and/or albuminous materials which is transparent and tenacious.

It is another object of this invention to provide a moisture-proofing composition for packaging and wrapping materials of the aforementioned type which remains pliable and flexible at extremely low temperatures and yet is not readily removed or impaired by handling.

It is another object of this invention to provide a moisture-proofing composition for packaging and wrapping materials of the aforementioned type which imparts no odor to the articles wrapped therein.

It is a further object of this invention to provide an improved transparent and glossy moisture-proof sheet of regenerated cellulose and/or sheet of cellulose derivative and/or sheet of albuminous materials.

Other objects of this invention will become apparent from the following description and the appended claims.

I have found that it is possible to obtain the foregoing objects by using a composition comprising a new type of synthetic viscous, plastic, high-molecular weight hydrocarbon resin in admixture with a wax and/or other hardening agents. Synthetic resins of this type are hereinafter referred to as "viscoresins."

These viscoresins, produced by the polymerization of certain olefinic hydrocarbons under appropriate conditions, are viscous, plastic materials usually of an extremely "tacky" or sticky nature having high average molecular weights ranging from 1000 to 12000 and preferably from 1500 to 8000. They are essentially saturated hydrocarbons in their chemical composition and reactions although their empirical formula is approximately $C_nH_{2n}$.

The viscoresins can be produced in various ways from various materials of polymerization, condensation, and/or hydrogenation, and although they may differ somewhat depending on the method of manufacture, they possess generally similar properties.

The preferred viscoresin is made by the polymerization of isobutylene with aluminum chloride or preferably boron trifluoride. In making this resin it is desirable to carry out the polymerization at a low temperature, for instance below 0° F. and preferably from —40° F. to —100° F. or even lower. The polymerization reaction may be carried out in the presence of a solvent such as naphtha, hexane, pentane, butane or propane, which acts as an inert diluent and facilitates handling the viscous product and cooling the reaction.

Other unsaturated hydrocarbons can also be polymerized to make viscoresins suitable for my purpose. Among these may be mentioned isopropyl ethylene, normal butylene and other mono-olefins. Branched chain, and particularly iso-mono-olefins are preferred.

The starting material, catalysts, and polymerizing conditions for the production of a viscoresin having certain desired properties can readily be determined by experiment. One preferred method is to treat isobutylene in the presence of an equal volume of butane at a temperature of —80° F., with about 0.1% to 0.5% by weight of boron trifluoride. Thus, the isobutylene which is liquid at —40° F. can be held in a vessel surrounded by a refrigerating bath and boron trifluoride gas can be led in with constant stirring until the desired plastic, viscous resin is produced. The reaction under these conditions is complete within a few minutes and produces a viscoresin having a degree of plasticity which is usually highly desirable in connection with my invention. The reaction product may be obtained by warming to remove butane and unreacted boron fluoride, neutralized and washed with water.

The hardness of the viscoresin produced can be controlled to a considerable extent by the proper selection of the starting materials, catalysts, reaction temperature, etc. Thus, in the case of the viscoresins produced from isobutylene by the use of a boron trifluoride catalyst as above described, it is a general rule that the lower the reaction temperature the harder are the viscoresins produced. Also under given reaction conditions pure isobutylene gives a harder viscoresin than does a mixture of petroleum refinery gases which contain isobutylene. It is also possible by the use of solvents, such as liquefied normally gaseous hydrocarbons such as butane and propane, acetone-alcohols, acetone-benzol or by vacuum distillation and/or other processes to fractionate viscoresins into relatively hard fractions and relatively soft fractions in order to produce viscoresins having the desired properties.

In some cases it will be found that a small amount of synthetic oil is produced in the polymerization reaction. A substantial amount of oil is detrimental to the use of these viscoresins in moisture-proofing compositions. This oil may be removed from the viscoresin by extraction with solvents such as propane, acetone-alcohol or acetone-benzol and/or by vacuum distillation, etc. However, in most cases satisfactory compositions can be made without fractionating the viscoresin and without removing any small amount of synthetic oil produced with it.

If the viscoresin produced is not of satisfactory color and odor, it can be rendered so, if desired, by treatment in light hydrocarbon solution, or otherwise, with sulfuric acid, with fuller's earth or other treating agents as in the manufacture of refined petroleum oils.

I have found that a composition comprising 1 to 10% and preferably 2 to 6% of viscoresin and a wax when applied to a base of the regenerated cellulose type produces a superior moisture-proof wrapping and/or packaging material. I prefer to use hydrocarbon waxes having melting points between 120° F. to about 180° F. and preferably paraffin waxes having melting points between 130° F. and 155° F. However, this invention contemplates, in lieu of the paraffin wax, the use of wax derivatives and other waxes or waxy materials such as ceresin, Montan wax, carnauba wax, spermaceti, Japan wax and other hardening agents, such as rosin and/or other solid and semi-solid resins whether the same be natural resins or synthetic resins and/or mixtures thereof.

The moisture-proofing composition is preferably applied in solution in a suitable solvent, such as benzol, xylene, toluene, light naphtha, and/or other suitable solvents which have no detrimental effect upon the base material. I prefer to apply a moisture-proofing composition to the base material at a temperature at the melting point of the wax. For this reason I prefer to employ a solvent having a boiling point slightly above the melting point of the wax. The moisture-proofing composition may be applied by passing sheets of base material through a bath of the moisture-proofing composition, or I may spray the moisture-proofing composition on to the base materials. Since it is necessary to apply only a very thin film of moisture-proofing composition to the base material, the excess of the same is removed by a suitable means, preferably by passing the sheets through a series of rollers. After application of the moisture-proofing composition, the same may be dried by suitable means, such as by passing a current of warm air over the same.

Where a transparent material is not desired, a pigment may be added to the moisture-proofing composition. Furthermore, if desired, a moisture-proofing composition may be characteristically colored by the use of suitable soluble dyes.

The following compositions illustrate specific examples of the preferred embodiment of this invention.

*Example I*

| | Percent |
|---|---|
| Viscoresin | 2 |
| Paraffin wax 130° F. M. P | 98 |

*Example II*

| | Percent |
|---|---|
| Viscoresin | 4 |
| Paraffin wax 140° F. M. P | 96 |

*Example*

| | Percent |
|---|---|
| Viscoresin | 6 |
| Paraffin wax 150° F. M. P | 94 |

Non-fibrous sheets of the regenerated cellulose type moisture-proofed in the above described manner possess an improved gloss, are transparent, and have a higher degree of moisture-proofness. Furthermore, the moisture-proofing composition adheres more tenaciously and remains more flexible and pliable at extremely low temperature than prior art materials.

While I have illustrated this invention with specific embodiments thereof, it is to be understood that the same do not limit the scope of the invention which is expressed in the appended claims which are to be construed as broadly as the prior art will permit.

I claim:

1. The method of making wrapping materials which remain flexible at low temperatures which comprises moisture-proofing non-fibrous transparent sheets formed of a substance selected from the group which consists of regenerated cellulose, cellulose derivatives and albuminous substances, by applying a moisture-proofing composition comprising a wax and from about 1% to 10% of a high molecular weight product of the low temperature polymerization of isobutylene thereto.

2. The method of making wrapping materials which remain flexible at low temperatures which comprises moisture-proofing non-fibrous transparent sheets formed of a substance selected from the group which consists of regenerated cellulose, cellulose derivatives and albuminous substances, by applying a moisture-proofing composition comprising a wax and from about 1% to 10% of a high-molecular weight product of the low temperature polymerization of an iso-mono-olefin thereto.

3. The method of making wrapping materials which remain flexible at low temperatures which comprises moisture-proofing non-fibrous transparent sheets formed of a substance selected from the group which consists of regenerated cellulose, cellulose derivatives and albuminous substances, by applying a moisture-proofing composition comprising a wax, from about 1% to 10% of a product of the low temperature polymerization of isobutylene having a molecular weight of 1500 to 8000 and a solvent thereto.

4. The method of making wrapping materials which remain flexible at low temperatures which comprises moisture-proofing non-fibrous transparent sheets formed of a substance selected from the group which consists of regenerated cellulose, cellulose derivatives, and albuminous substances by applying a moisture-proofing composition comprising 94-98% paraffin wax and 2% to 6% of a high-molecular weight product of the low temperature polymerization of isobutylene thereto.

5. A moisture-proof non-fibrous wrapping sheet which remains flexible at low temperatures comprising a base of regenerated cellulose and a moisture-proof coating comprising 94-98% paraffin wax having a melting point above 125° F. and 2% to 6% of a high-molecular weight product of the low temperature polymerization of isobutylene.

6. A moisture-proof non-fibrous wrapping sheet which remains flexible at low temperatures comprising a base of regenerated cellulose and a moisture-proof coating comprising a wax and from about 1% to about 10% of a high molecular weight product of the low temperature polymerization of isobutylene.

7. A moisture-proof non-fibrous wrapping sheet which remains flexible at low temperatures comprising a base of regenerated cellulose and a moisture-proof coating comprising a wax and from about 1% to about 10% of a high molecular weight product of the low temperature polymerization of iso-mono-olefin.

EDWARD B. BEALE.